UNITED STATES PATENT OFFICE.

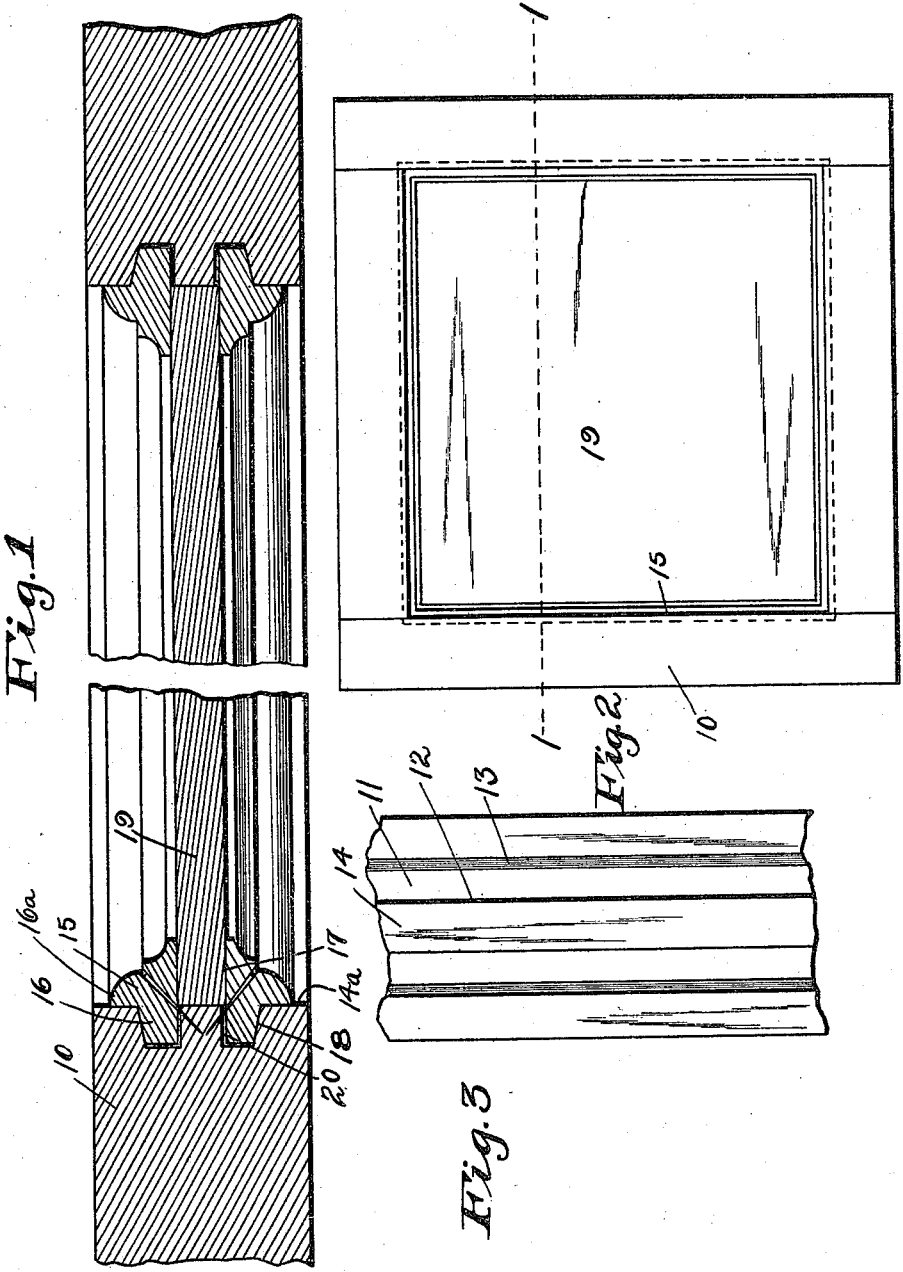

HARRISON WILLIAM PHILLIPS, OF MUSCATINE, IOWA.

PANELING DOORS.

965,220.

Specification of Letters Patent. Patented July 26, 1910.

Application filed April 30, 1910. Serial No. 558,671.

*To all whom it may concern:*

Be it known that I, HARRISON WILLIAM PHILLIPS, a citizen of the United States, residing at Muscatine, in the county of Muscatine and State of Iowa, have invented a certain new and useful Improvement in Paneling Doors, of which the following is a specification.

The object of my invention is to provide a paneled door of simple and inexpensive construction, in which the moldings for securing the panels in place will fit tightly against the panels and the adjacent portions of the door rail to thereby form tight joints, and to firmly hold the panels in position.

My invention consists in the construction and arrangement of the various parts, whereby the objects contemplated are attained, as hereinafter more fully set forth, pointed out in my claims and illustrated in the accompanying drawings, in which—

Figure 1 shows a sectional view through a door embodying my invention on the dotted line 1, 1, of Fig. 2. Fig. 2 shows a side elevation of a door having my improvement applied thereto, and Fig. 3 shows an inside face view of a panel rail forming part of my invention.

Referring to the accompanying drawings, I have used the reference numeral 10 to indicate the panel rails. Each rail is provided on its inner face with two grooves 11, and each groove has one straight side 12, and the opposite side 13 inclined inwardly and away from the side 12 to form a tapered groove narrowest at its bottom. Between the said grooves is a rib 14, and beyond the grooves are the flat surfaces $14^a$. For each of the said grooves I provide a molding comprising a body portion 15, having a wedge shaped extension 16, designed to enter the grooves, and also having a rib $16^a$ extended outwardly from the molding to overlap the adjacent flat surface $14^a$. The side of the molding opposite from the rib $16^a$ is flat and is indicated by the numeral 17. The inclined part of the molding is indicated by the numeral 18 as shown in Fig. 1. The panel is of the ordinary size and shape and is indicated by the numeral 19. The thickness of the panel is preferably slightly greater than the thickness of the rib 14. As shown in Fig. 1, the said moldings are held in place in the ordinary way by means of small nails 20, extended through them and into the rib 14.

In practical use I first place one of the moldings in position in the panel rail. I then place the panel in position resting against the molding, and I then insert the other molding in position on the opposite side of the panel. I then drive the moldings outwardly into the grooves 11. This will cause the inner faces 17 of the moldings to firmly engage the adjacent surfaces of the panel. Then when the moldings have been driven into position with the ribs $16^a$ engaging the flat surface $14^a$, the said ribs will tend to tilt the moldings so that the inner ends thereof that overlap the panels, will press firmly against the said panel so that the inner edges of the molding will engage the panels just as firmly as the central portions of the molding. By means of this assembling of the door members, it is obvious that the material of the panels will be firmly compressed at the points where it is engaged by the moldings, so that tight joints may be provided between the moldings and the panel, and between the moldings and the panel rail, even though the panels themselves vary in thickness. In order that a tight joint may be made between the moldings and the panel, it is necessary that the rib 14 be of slightly less thickness than the average panel, and without the ribs $16^a$ it is obvious that there would be a tendency for the outer edges of the moldings, within the grooves 11, to tilt toward each other, and it is necessary to overcome this tendency by means, such for instance as the ribs $16^a$ engaging the shoulders $14^a$, to thereby tend to tilt the inner edges of the moldings toward the panel.

I claim as my invention:

1. A paneled door comprising panel rails provided with grooves having their outer faces beveled or inclined to provide tapered grooves, smallest at their bottoms, a panel adjacent to the panel rail between said grooves, and a tapered molding fitted into one of said grooves, and having a flat side designed to overlap the panel and also having a part projecting outwardly from the other side to overlap the panel rail and to engage the panel rail to thereby force the part of the molding that engages the panel into firm contact therewith, for the purposes stated.

2. A paneled door comprising a panel rail, having two parallel grooves therein, the outer sides of the grooves being beveled or inclined, and also having a rib between the grooves and flat shoulders adjacent to the outer edges of the grooves, a panel in the door adjacent to said rib, and of slightly greater thickness than the rib and two moldings each being flat on one side and provided with a tapered portion on the other side to engage the tapered portion of the groove, and each also being formed with a rib on the side opposite from the flat side, designed to engage the shoulder on the panel rail, substantially as and for the purposes stated.

Des Moines, Iowa, March 8th, 1910.

HARRISON WILLIAM PHILLIPS.

Witnesses:
RALPH J. LILLIBRIDGE,
FRED C. PETERSEN.